Dec. 19, 1961     E. L. CZENKUSCH     3,014,019
SOLID POLYMER AND METHOD OF PRODUCTION
Filed July 2, 1956
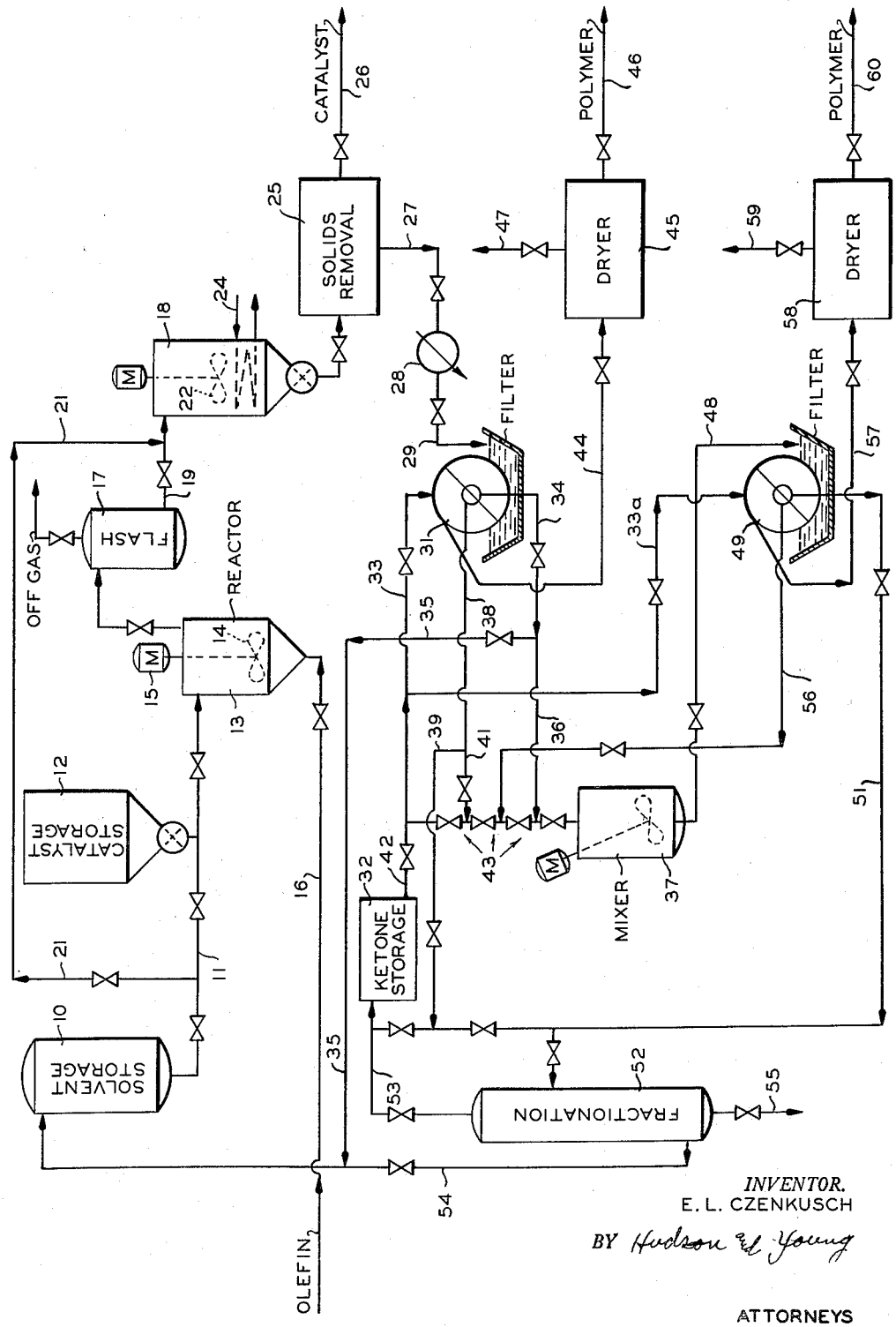
INVENTOR.
E. L. CZENKUSCH
BY Hudson & Young
ATTORNEYS

United States Patent Office 3,014,019
Patented Dec. 19, 1961

3,014,019
SOLID POLYMER AND METHOD OF PRODUCTION
Edward L. Czenkusch, Bartlesville, Okla., assignor to Phillips Petroleum Company, a corporation of Delaware
Filed July 2, 1956, Ser. No. 595,457
13 Claims. (Cl. 260—94.9)

This invention relates to the production of solid polymers. In one of its aspects, it relates to a method for producing a solid polymer by means of a process which reduces color and odor present in such polymer.

It has recently been discovered that 1-olefins having a maximum of 8 carbon atoms per molecule and no branching nearer the double bond than the 4-position can be polymerized to solid and semi-solid polymers at temperatures and pressures which are relatively low as compared with conventional processes for polymerizing such olefins. Such polymerization is sometimes carried out by first admixing and at least partially dissolving the olefins in a non-polymerizable solvent and by carrying out the polymerization in the presence of a catalyst.

In the copending application of Hogan et al. filed December 20, 1954, Serial No. 476,306, and now abandoned, a process is disclosed for producing polymers of 1-olefins by carrying out the polymerization at a temperature in the range of 100 to 500° F. in the presence of 0.1 to 10 or more weight percent of chromium oxide, preferably including a substantial proportion of hexavalent chromium associated with at least one porous oxide selected from the group consisting of silica, alumina, zirconia and thoria. A preferred catalyst is one comprising 0.1 to 10 weight percent chromium in chromium oxide supported upon a silica-alumina base such as 90 percent silica-10 percent alumina. The catalyst employed is ordinarily a highly oxidized catalyst which has been activated by treatment at an elevated temperature under non-reducing conditions and preferably in an oxidizing atmosphere. Olefins, other than 1-olefins as described are polymerized by the action of this catalyst but some such polymers are preponderantly normally liquid at least when polymerized under the described conditions. Polymerization suitably is carried out in the liquid phase such as in solution in a hydrocarbon solvent, especially a paraffin or a cycloparaffin which is liquid under the polymerization conditions; however, vapor phase operation or mixed-phase operation can be effected. Diolefins such as 1,3-butadiene and isoprene are within the scope of this invention.

It is an object of this invention to provide an improved process for the removal of color bodies and odor bodies from solid polymers. It is also an object of this invention to provide solid polymers of 1-olefins having improved color and odor characteristics. It is also an object of this invention to provide a process for the polymerization of 1-olefins wherein the solid polymers are removed from the solvent and the objectionable impurities are retained by the solvent. It is a further object to precipitate polyethylene from a solvent in which color bodies and odor bodies are soluble and are, therefore, separated from the solid polyethylene.

Other objects and advantages will be apparent to one skilled in the art upon study of this disclosure including the drawing wherein a diagrammatic flow of the process is presented.

I have discovered a process for the removal of color and odor bodies from solid polymers, thereby enhancing their value for such uses as the provision of films for food packaging and other uses when such impurities are introduced with reagents used in the process. In addition, better yield of solid polymer is obtained by this process than by precipitation by cooling the solution and filtering the solid polymer. In fact, the polymer yield approximates that obtained by flashing off the solvent from the polymer. However, flashing does not remove color and odor bodies. The polymer, in the absence of such impurities, is substantially colorless and odorless.

In accordance with the invention polymers of olefins, particularly ethylene and/or propylene polymers prepared according to the process described in copending application Serial No. 476,306, can be simply and effectively removed from the solvent in which they are prepared by adding thereto a suitable antisolvent. It has been found that by utilization of this procedure the polymer is removed without removing color and odor bodies which may have been introduced during formations of the polymer. In the practice of the process of this invention the solvent recovered from the polymerization process containing dissolved polymer is cooled to precipitate the heavy polymer which is removed by filtering, centrifuging, decanting, or the like. The recovered polymer is then washed with a suitable antisolvent such as a ketone. Additional polymer is then precipitated from the filtrate by adding thereto an antisolvent and is recovered by a separation step such as filtration. The filtrate from this step is sent to a separation zone to separate antisolvent from solvent. The antisolvent as well as the solvent can be recycled to be reused in the process.

The antisolvent can be a ketone having not more than 6 carbon atoms per molecule or an alcohol having not more than 6 carbon atoms per molecule. Specific antisolvents contemplated include acetone, methyl ethyl ketone, methyl isobutyl ketone, methyl propyl ketone, methyl alcohol, ethyl alcohol, isopropyl alcohol, n-butyl alcohol, n-propyl alcohol, isobutyl alcohol, and amyl alcohols.

Hydrocarbon solvents or diluents, preferably paraffins and/or cycloparaffins, serve as solvents for the polymer products to aid in the removal of the product from the catalyst in the reactor or as diluents. The solvents include aliphatic paraffins containing from 3 to 12, preferably 5 to 12, carbon atoms per molecule and cycloparaffins containing from 5 to 12 carbon atoms per molecule. Any hydrocarbon which is relatively inert, non-deleterious, and liquid under the reaction conditions of the process can be utilized. Solvents that have been used successfully for the polymerization of ethylene, propylene and other olefins according to the invention as set forth in copending application Serial No. 476,306, include propane, isobutane, n-butane, n-pentane, isopentane, isooctane (2,2,4-trimethylpentane), cyclohexane, and methylcyclohexane. N-hexane, the isohexanes such as neohexane and diisopropyl, n-heptane, the isoheptanes such as 2-methylhexane and triptane, n-octane, n-nonane, the isononanes, cyclopentane, methylcyclopentane, the dimethylcyclopentanes, and the diethylcyclohexanes can also be used. The heavier paraffinic and isoparaffinic solvents have a higher solvent power for the product polymer than do the lighter ones. However, the lighter paraffins and isoparaffins are quite useful in our process since the polymer exhibits high solubility in the lighter hydrocarbons at temperatures above the melting point of the polymer, particularly if the solvent is maintained in liquid phase.

The molecular weight and properties of the heavy polymer can be adjusted within limits by the temperature to which the solvent containing dissolved polymer is cooled. The temperature to which the polymer-containing solvent can be cooled can range from about 100 or lower to about 200° F. Fractional precipitation of additional polymer from the filtrate is obtained by adding to the filtrate an antisolvent, such as acetone or other ketone, in an amount effective to cause part of the polymer to separate from the filtrate. The higher molecular weight polymers, being the least soluble, separate first. By adding incremental portions of ketone and removing the insoluble polymers after each addition, the starting material may be resolved into any desired number of fractions varying in average molecular weight. A waxy fraction or liquid polymer may be obtained if desired.

It should be emphasized that yield is improved upon precipitation and washing of the precipitate with an antisolvent as compared with the yield obtained by using cyclohexane or other solvents as wash. The antisolvent washes the filter cake by displacement without dissolving heavy polymer. The antisolvent is then evaporated from the purified polymer.

A more complete understanding of the invention will be obtained from a consideration of the accompanying drawing which is a diagrammatic flow plan of the process of the invention and in which certain valves, motors, and other control and operational means commonly employed by those skilled in the art are not illustrated so as to preserve a maximum of simplicity in the presentation. Referring now to the drawing, a solvent such as isooctane, cyclohexane or methylcyclohexane, is drawn from storage tank 10 and passed through line 11 so as to pick up and maintain in a dispersed state a finely divided solid catalyst such as chromium oxide deposited upon a silica-alumina catalyst base and introduced into feed line 11 from catalyst storage 12. The stream of solvent containing a catalyst suspended therein is introduced to a reactor 13 having therein agitator 14 powered by motor 15 to maintain the contents of reactor 13 in a state of agitation sufficient to maintain the catalyst in the suspended state and to provide uniform mixing of the reactants. A suitable 1-olefin feed, such as ethylene or propylene or a mixture of such olefins, is passed through line 16 to polymerization reactor 13. Conditions in the reactor are maintained in accordance with the disclosure of the above-referred to copending application Serial No. 476,306, filed December 20, 1954. These conditions comprise temperature in the range of 100 to 500° F. and a pressure high enough to maintain the materials in a liquid phase and to assure that olefins not liquefied under these conditions are dissolved in the liquid phase in sufficient amount to accomplish the desired polymerization. Pressures ordinarily range from 100 to 700 p.s.i. but can be lower or higher if desired. The effluent from the reactor 13 is passed to a flash zone 17 where light gases are taken off overhead. The liquid reactor effluent from flash zone 17 is then passed to a dissolution vessel 18 through line 19 along with added solvent introduced through line 21. An agitator 22 aids in dissolution of the solid polymer. Heat can be added to dissolution chamber 18 if desired through heating means 24. The solution of polymer in solvent is then passed to solids removal zone 25, which can be a centrifuge, filter or other liquid-solids separation means, wherein the solid catalyst is separated from the polymer solution and removed from the system through line 26. The solution of polymer in solvent is then withdrawn from solids removal zone 25 and passed through line 27 to cooler 28 where the temperature of the solution is reduced sufficiently to cause precipitation of at least a portion of the polymer in solution. The slurry of precipitated solid polymer in solvent is passed through line 29 to liquid-solids separation means 31 shown as filter 31. The filter cake which is picked up on the drum of filter 31 is washed with an antisolvent such as a ketone having up to 6 carbon atoms so as to remove the solvent from the polymer with a material in which the polymer is not soluble. The anti-solvent or ketone in ketone storage 32 is passed through lines 42 and 33 for this washing step. The solvent removed from filter 31 through line 34 can be passed through line 36 to mixer 37. The antisolvent used to wash the filter cake is removed from filter 31 through line 38 and can be returned to ketone storage 32 through line 39 or passed to mixer 37 through line 41. The solvent from filter 31 is still saturated with polymer and this stream is normally directed through lines 34 and 36 to mixer 37 wherein its is contacted with the antisolvent which was used as the wash material for the filter cake on filter 31 and was then passed through lines 38 and 41 to mixer 37. Additional antisolvent is introduced from the ketone storage to mixer 37 through line 42 and manifold 43. Filter cake is removed from filter 31 by line 44 and passed to drier 45 where the polymer is dried and removed as product via line 46; vapors being taken overhead from drier 45 through line 47. A slurry of solid polymer and a liquid mixture of solvent and antisolvent is removed from mixer 37 and passed through line 48 to another liquid solids separation means illustrated as filter 49. The filter cake formed on the drum of filter 49 is washed with a stream of antisolvent from ketone storage 32 introduced to filter 49 through line 33a. The mixture of solvent and antisolvent is removed from filter 49 through line 51 and is passed to fractionator 52 where the antisolvent is removed overhead through line 53 and returned to ketone storage 32, a sidecut comprising solvent is removed through line 54 and is passed to solvent storage 10, and a kettle product containing color bodies and odor bodies removed from the solid polymer is removed from the bottom of fractionator 52 through line 55 and passed to a disposal means. The antisolvent used to wash the filter cake in filter 49 is removed from filter 49 through line 56 and returned to mixer 37. The filter cake is removed from filter 49 by line 57 and is passed to drier 58, where volatile material is removed through line 59 and polymer product is recovered at 60.

The solid polymer removed from driers 45 and 58 is substantially improved in color and odor characteristics over solid 1-olefin polymer produced by prior methods. The impurities which are present as a result of their solubilities in the solvent employed have been found to retain their solubilities in the solvent under conditions resulting in precipitation of at least a portion of the polymers in solution.

The following examples are presented as an illustration of this invention but are not to be construed as limiting the invention.

*Example 1*

Polyethylene was prepared by contacting ethylene with a catalyst comprising 2.5 weight percent chromium as oxide in a chromium oxide-silica-alumina catalyst prepared by impregnating silica-alumina, ratio 9:1 by weight, with $CrO_3$ solution, and activation of the resulting catalyst at a temperature above 700° F. in dry air.

The polymerization was carried out with cyclohexane as the solvent for the ethylene and as the vehicle in which the finely divided solid catalyst was suspended. Ethylene was agitated with the catalyst slurry. The polymer was substantially dissolved in the cyclohexane at the polymerization conditions and the catalyst was allowed to settle, unreacted ethylene was flashed off, the temperature was reduced, and the solution of polymer was separated from the catalyst by filtration means. The solution of polymer in cyclohexane was cooled to room temperature and the precipitated polymer was removed. The supernatant liquid, or filtrate contained 0.105 weight percent polyethylene at room temperature (73° F.).

The polymerization temperature was about 270° F. and the pressure was about 450 p.s.i. The yield was 26.7 lb. of polymer per lb. of catalyst. The polymer had a melt index[1] of 0.8. An equal volume of acetone was added to a sample of the solution of 0.105 wt. percent polymer in cyclohexane at room temperature and atmospheric pressure. Under these conditions 10.5 weight per- ---
[1] Melt index, as determined by ASTM Method D–1238–52T, is the rate of extrusion of a thermoplastic material through an orifice of a specified length and diameter, under prescribed conditions of temperature and pressure.

cent of the dissolved polymer was precipitated as solid polymer. The proportion of polymer precipitated by the addition of the antisolvent is greater at higher temperatures.

*Example II*

Polyethylene was prepared by contacting ethylene with a catalyst prepared as in Example I under the same polymerizing conditions as in Example I. The polymer was separated from the solvent as in Example I. The yield was 21.5 lb. of polymer per lb. of catalyst and the polymer had a melt index of 0.6.

Samples of the polymer were placed upon separate filters, one sample was washed with cyclohexane and the other was washed with acetone. The polyethylene washed with cyclohexane suffered a 0.12 weight percent loss and the polyethylene washed with acetone suffered a 0.05 weight percent loss.

The above examples illustrate the antisolvent effect of a ketone upon a 1-olefin polymer in a hydrocarbon solvent and that impurities can be removed from a 1-olefin polymer by use of a ketone with substantially no loss of polymer.

Reasonable variations and modifications are possible within the scope of the present invention, the essence of which is the discovery that color bodies and odor bodies can be separated and removed from the polymers of 1-olefins by cooling the solvent containing the polymer to precipitate the major portion of the polymer, and adding an antisolvent, such as an alcohol or a ketone, to precipitate substantially all of the remaining polymer while leaving the color bodies and odor bodies in the solvent.

That which is claimed is:

1. In a process wherein a solid polymer of an aliphatic 1-olefin selected from the group consisting of ethylene and propylene is separated from solution in a solvent by cooling the solution thereby precipitating a fraction of said polymer and subsequently separating the resulting precipitate from the supernatant liquid the improvement which comprises washing said precipitate with a ketone having not more than 6 carbon atoms per molecule to remove color and odor bodies therefrom; adding to said supernatant liquid an additional amount of said ketone antisolvent thereby precipitating additional dissolved polymer from said supernatant liquid; and washing said additional polymer precipitate with an additional amount of said ketone antisolvent to remove color and odor bodies therefrom.

2. In a process wherein a solid polymer of an aliphatic 1-olefin selected from the group consisting of ethylene and propylene is recovered from solution in a liquid hydrocarbon diluent selected from the group consisting of paraffins and cycloparaffins by cooling to form a precipitate and separating said precipitate as a product from the supernatant liquid, the improvement which comprises washing said precipitate with a ketone having not more than 6 carbon atoms per molecule to remove impurities therefrom; adding to at least a portion of said supernatant liquid additional ketone having no more than 6 carbon atoms per molecule thereby precipitating additional polymer; recovering said additional polymer as an additional product and separating and recovering diluent and ketone from impurities contained therein.

3. In a process wherein an aliphatic 1-olefin selected from the group consisting of ethylene and propylene is polymerized to form solid polymer by contacting at a temperature in the range of 100 to 500° F. in admixture with a liquid hydrocarbon diluent selected from the group consisting of paraffins and cycloparaffins, with a catalyst comprising a minor proportion of chromium oxide, including a substantial proportion of hexavalent chromium, associated with at least one additional oxide selected from the group consisting of silica, alumina, zirconia and thoria and the resulting polymer is recovered from solution in said hydrocarbon by cooling to produce a precipitate and separating said precipitate as a product of the process from the supernatant liquid, the improvement which comprises washing said precipitate with a ketone having not more than 6 carbon atoms per molecule to remove impurities therefrom; adding to at least a part of said supernatant liquid additional ketone having not more than 6 carbon atoms per molecule thereby precipitating additional polymer; separating said additional polymer from said liquid; washing said polymer with a ketone having not more than 6 carbon atoms per molecule to remove impurities therefrom; recovering said additional polymer and separating and recovering said diluent and said ketone from impurities contained therein.

4. A process according to claim 3 wherein said ketone is acetone.

5. A process according to claim 3 wherein said ketone is methyl ethyl ketone.

6. A process according to claim 3 wherein said ketone is methyl isobutyl ketone.

7. A process according to claim 3 wherein said ketone is methyl propyl ketone.

8. A process according to claim 3 wherein said ketone is ethyl propyl ketone.

9. In a process wherein a solid polymer of an aliphatic 1-olefin selected from the group consisting of ethylene and propylene is recovered from solution in a liquid hydrocarbon diluent selected from the group consisting of paraffins and cycloparaffins by cooling to form a precipitate and separating said precipitate as a product of the process from a supernatant liquid, the improvement which comprises washing said precipitate with a ketone having no more than 6 carbon atoms per molecule; recovering the wash liquid utilized in the above washing step; adding to at least a portion of said supernatant liquid additional ketone as hereinbefore described thereby precipitating additional polymer; recovering said polymer as an additional product of the process; and recovering said liquid hydrocarbon and said ketone from impurities contained therein.

10. In a process wherein an aliphatic 1-olefin selected from the group consisting of ethylene and propylene is polymerized to form a solid polymer by contacting at a temperature in the range of 100 to 500° F., in admixture with a liquid hydrocarbon diluent selected from the group consisting of paraffins and cycloparaffins, with a catalyst comprising a minor proportion of chromium oxide including a substantial amount of hexavalent chromium associated with at least 1 additional oxide selected from the group consisting of silica, alumina, zirconia and thoria and recovering the resulting polymer from solution in said hydrocarbon by cooling to a temperature in the range of 70 to 200° F. to form a precipitate and separation of said precipitate as a product of the process from the supernatant liquid, the improvement which comprises washing said precipitate with acetone; adding acetone to at least a portion of said supernatant liquid thereby precipitating additional polymer; separating said additional polymer from said liquid; washing said polymer with acetone to remove impurities therefrom; and recovering said additional polymer as an additional product of the process.

11. In a process wherein a polymer of an aliphatic 1-olefin selected from the group consisting of ethylene and propylene is separated from solution in a solvent by cooling the solution and precipitating a fraction of said polymer and separating the resulting precipitate from the supernatant liquid the improvement comprising washing the precipitate with a ketone having not more than 6 carbon atoms per molecule to remove impurities with substantially no removal of polymer; adding an additional amount of said ketone to the supernatant liquid; and recovering additional polymer precipitated therefrom.

12. In a process wherein a polymer of an aliphatic 1-olefin selected from the group consisting of ethylene and propylene is separated from solution in a solvent by precipitating a fraction of said polymer and separating the resulting precipitate from the supernatant liquid the improvement comprising washing the precipitate with an antisolvent, a ketone having not more than 6 carbon atoms per molecule, to remove impurities with substantially no removal of polymer; adding an additional amount of said ketone to said supernatant liquid to precipitate an additional fraction of polymer; separating the additional fraction precipitate; washing said additional precipitate with an additional amount of said ketone; and recovering ketone and solvent from impurities contained therein.

13. In a process wherein ethylene is polymerized to form a solid polymer in the presence of a catalyst comprising a minor proportion of chromium oxide including a substantial amount of hexavalent chromium associated with at least one additional oxide selected from the group consisting of silica, alumina, zirconia, and thoria, at a temperature in the range of 100 to 500° F. in admixture with cyclohexane the improvement which comprises cooling the resulting reaction mixture in the range of 70 to 200° F. to form a precipitate of polymer; separating said precipitate as a product of the process; washing said precipitate with acetone; passing said acetone to a recovery zone; adding acetone to at least a portion of said supernatant liquid thereby precipitating additional polymer; separating said additional polymer from said liquid; washing said polymer with acetone to remove impurities therefrom; recovering said additional polymer as an additional product of the process; passing said supernatant liquid to said recovery zone; and recovering said acetone and said cyclohexane from impurities contained therein.

References Cited in the file of this patent

UNITED STATES PATENTS

| | | |
|---|---|---|
| 2,482,056 | Elwell | Sept. 13, 1949 |
| 2,691,647 | Field et al. | Oct. 12, 1954 |
| 2,721,189 | Anderson et al. | Oct. 18, 1955 |
| 2,731,452 | Field et al. | Jan. 17, 1956 |
| 2,850,488 | Baxter et al. | Sept. 2, 1958 |

OTHER REFERENCES

Perry: "Chem. Engineers Handbook," pp. 715–717. McGraw-Hill (1950).